United States Patent
Kim et al.

(10) Patent No.: US 9,372,583 B2
(45) Date of Patent: Jun. 21, 2016

(54) DISPLAY DEVICE HAVING A TOUCH SCREEN AND METHOD OF DRIVING THE SAME

(71) Applicant: LG DISPLAY CO., LTD., Seoul (KR)

(72) Inventors: Sung-Chul Kim, Gyeonggi-do (KR); Jung-Han Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 376 days.

(21) Appl. No.: 13/719,367

(22) Filed: Dec. 19, 2012

(65) Prior Publication Data
US 2014/0049508 A1    Feb. 20, 2014

(30) Foreign Application Priority Data
Aug. 16, 2012   (KR) .......................... 10-2012-0089577

(51) Int. Cl.
  *G06F 3/041* (2006.01)
  *G06F 3/044* (2006.01)
(52) U.S. Cl.
  CPC ................ *G06F 3/044* (2013.01); *G06F 3/041* (2013.01); *G06F 3/0412* (2013.01); *G06F 3/0416* (2013.01)
(58) Field of Classification Search
  CPC ........ G06F 3/041; G06F 3/0416; G06F 3/045
  USPC .................................................. 345/173, 174
  See application file for complete search history.

(56) References Cited

U.S. PATENT DOCUMENTS

| | | | |
|---|---|---|---|
| 2011/0074712 A1* | 3/2011 | Bak et al. | 345/173 |
| 2012/0162104 A1 | 6/2012 | Chang et al. | |
| 2012/0162584 A1 | 6/2012 | Chang et al. | |
| 2012/0218482 A1* | 8/2012 | Hwang et al. | 349/12 |
| 2013/0241868 A1* | 9/2013 | Kim et al. | 345/174 |

FOREIGN PATENT DOCUMENTS

| | | |
|---|---|---|
| KR | 10-2008-0013262 A | 2/2008 |
| WO | 2012/087639 A2 | 6/2012 |

OTHER PUBLICATIONS

Office Action dated Dec. 31, 2013, issued by the Korean Intellectual Property Office for Korean Patent Application No. 10-2012-0089577.

* cited by examiner

*Primary Examiner* — Fred Tzeng
(74) *Attorney, Agent, or Firm* — Morgan, Lewis & Bockius LLP

(57) ABSTRACT

A display device including a touch screen and method of driving the same are provided. In a method of driving display device including a touch screen, the display device including a panel including a plurality of gate lines, and a plurality of electrodes respectively corresponding to the plurality of gate lines, the method includes: applying, by a touch sensing unit, a touch scan signal to a display driving unit, applying, by the display driving unit: a gate signal to a subset of the plurality of gate lines, a common voltage to a first subset of the plurality of electrodes, corresponding to the subset of the plurality of gate lines, and a touch scan signal to a second subset of the plurality of electrodes, other than the first subset of the plurality of electrodes.

18 Claims, 9 Drawing Sheets

DISPLAY DEVICE HAVING A TOUCH SCREEN AND METHOD OF DRIVING THE SAME

CROSS-REFERENCE TO RELATED APPLICATION(S)

This application claims the benefit under 35 U.S.C. §119(a) of Korean Patent Application No. 10-2012-0089577, filed on Aug. 16, 2012, in the Korean Intellectual Property Office, the entire disclosure of which is incorporated by reference herein for all purposes.

BACKGROUND

1. Technical Field

The following description relates to a display device, and more particularly, to a display device having a touch screen.

2. Discussion of the Related Art

A touch screen is a kind of input device that is installed in an image display device, such as a liquid crystal display (LCD), a field emission display (FED), a plasma display panel (PDP), an electroluminescence device (EL), an eletrophoretic display (EPD), etc., to allow a user to input predetermined information by pressing (or touching) a touch sensor in the touch screen while viewing the image display device.

Recently, in order to implement a slim mobile terminal, such as a smart phone, a tablet PC, or the like, demands on an in-cell type display device integrated with a touch screen, in which elements configuring the touch screen are installed, are increasing.

Hereinafter, a method of driving a conventional display device having a touch screen will be described with reference to FIG. 1.

FIG. 1 is a timing diagram of signals appearing in display periods and touch periods of a conventional display device having a touch screen.

The conventional display device having the touch screen may be one of in-cell type self-capacitive displays. As shown in FIG. 1, the display device having the touch screen performs display driving and touch driving, respectively, by temporally separating display periods from touch periods.

However, since display periods are temporally separated from touch periods, it is difficult to ensure a touch sensing time. Also, due to an insufficient display driving time, it is difficult to ensure a charging time for display driving, which leads to deterioration of display quality.

SUMMARY

Embodiments of the present invention relate to a display device having a touch screen and method of driving the same. Accordingly, embodiments of the present invention are directed to a display device that substantially obviates one or more of the problems due to limitations and disadvantages of the related art.

An object of embodiments is to provide a display device having a touch screen capable of spatially separating display operation and touch operation.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a display device including a touch screen, including: a panel, including: a plurality of gate lines, a plurality of data lines, and a plurality of electrodes grouped into n groups in a direction in which the plurality of gate lines extend, where n is an integer equal to or greater than 2, a display driving unit configured to: apply a gate signal to the plurality of gate lines, apply a data signal to the plurality of data lines, and apply a common voltage or a touch scan signal to the plurality of electrodes, and a touch sensing unit configured to: generate the touch scan signal, and apply the touch scan signal to the display driving unit, wherein the display driving unit is further configured to apply the touch scan signal to at least one group other than a group corresponding to gate lines to which the gate signal is applied, among the n groups.

In another aspect, there is provided a method of driving a display device having a touch screen, the display device including a panel including a plurality of electrodes grouped into n groups, where n is an integer greater than 2, a display driving unit, and a touch sensing unit, the method including: at the touch sensing unit, applying a touch scan signal to the display driving unit, and at the display driving unit: applying a gate signal to a plurality of gate lines corresponding to a first group among the n groups, applying a common voltage to a plurality of electrodes belonging to the first group, and applying a touch scan signal to a plurality of electrodes belonging to a second group of the n groups.

In another aspect, there is provided a method of driving display device including a touch screen, the display device including a panel including a plurality of gate lines, and a plurality of electrodes respectively corresponding to the plurality of gate lines, the method including: applying, by a touch sensing unit, a touch scan signal to a display driving unit, applying, by the display driving unit: a gate signal to a subset of the plurality of gate lines, a common voltage to a first subset of the plurality of electrodes, corresponding to the subset of the plurality of gate lines, and a touch scan signal to a second subset of the plurality of electrodes, other than the first subset of the plurality of electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

DETAILED DESCRIPTION

Figure 1:
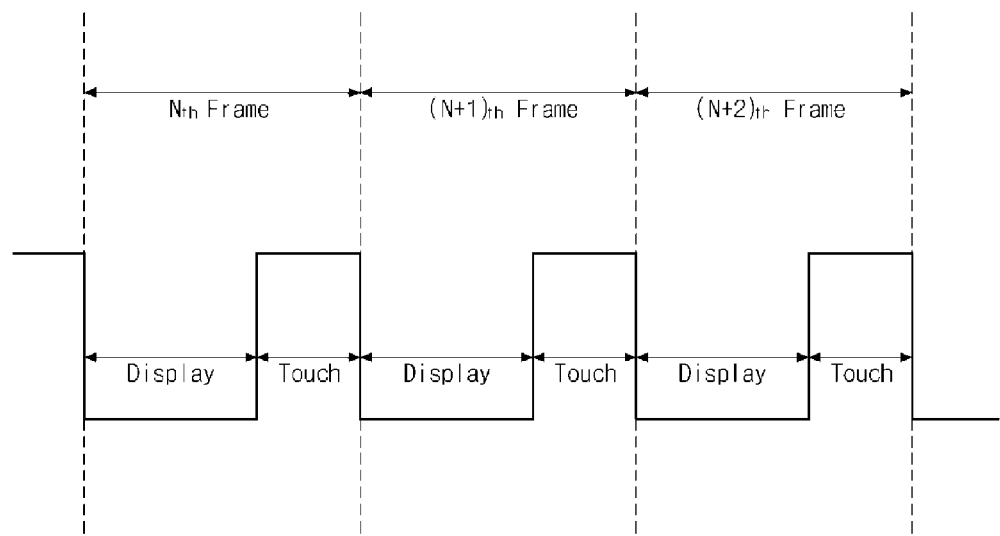
FIG. 1 is a timing diagram of signals appearing in display periods and touch periods of a conventional display device having a touch screen.

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In a display device having a touch screen according to an embodiment, a plurality of electrodes may be grouped into n groups, and a touch scan signal may be sequentially applied to the n groups. For convenience of description, in the following description, it is presumed that a plurality of electrodes are grouped into two or three groups. However, the electrodes may be grouped into four groups or more.

Figure 2:
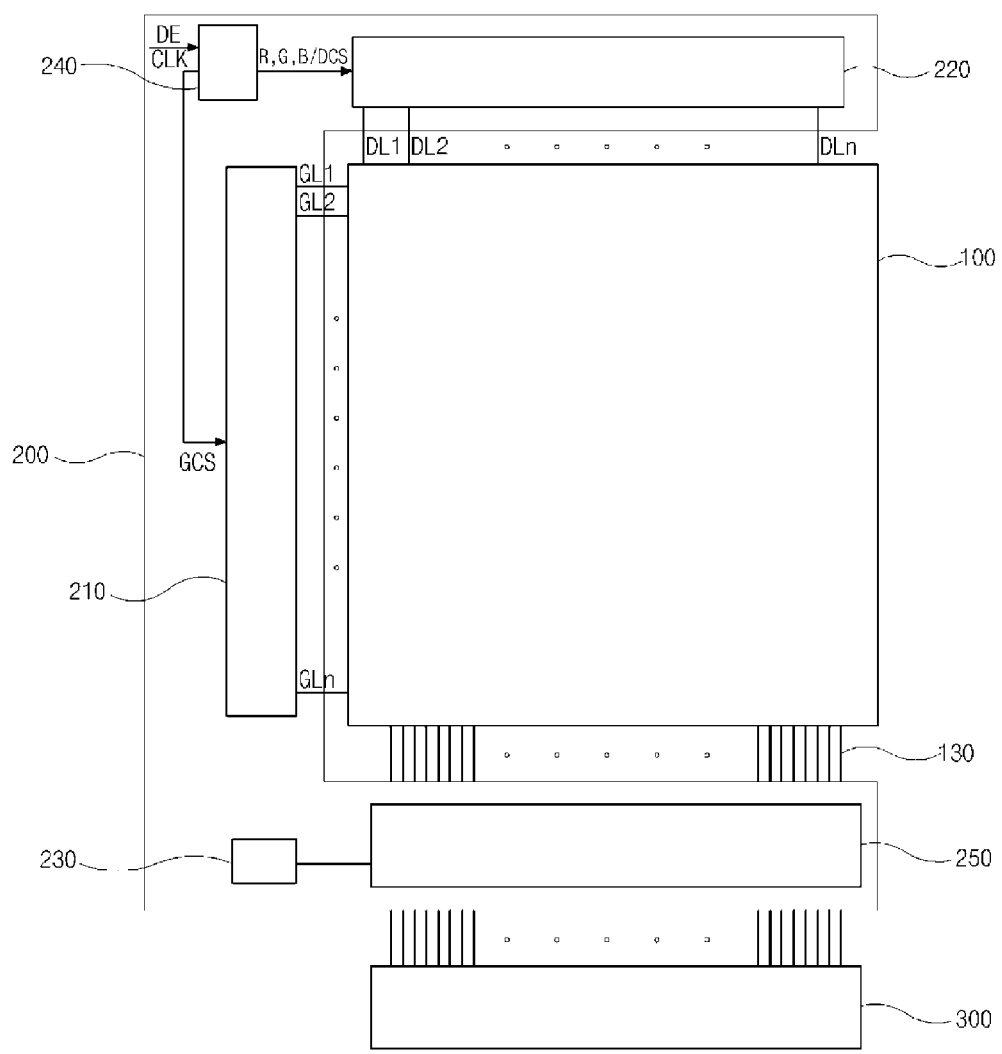
FIG. 2 is a schematic view illustrating a structure of a display device having a touch screen according to an embodiment.
Figure 3:
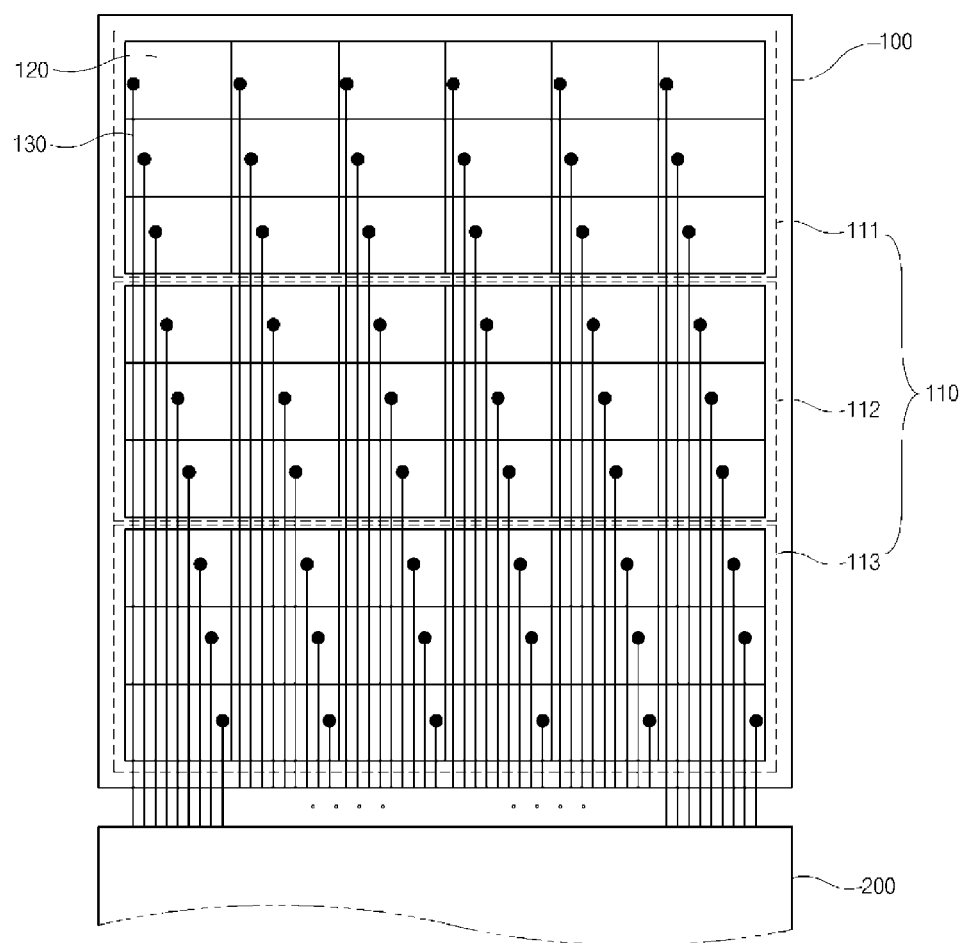
FIG. 3 illustrates a schematic view of a panel of the display device having a touch screen according to an embodiment.
Figure 4:
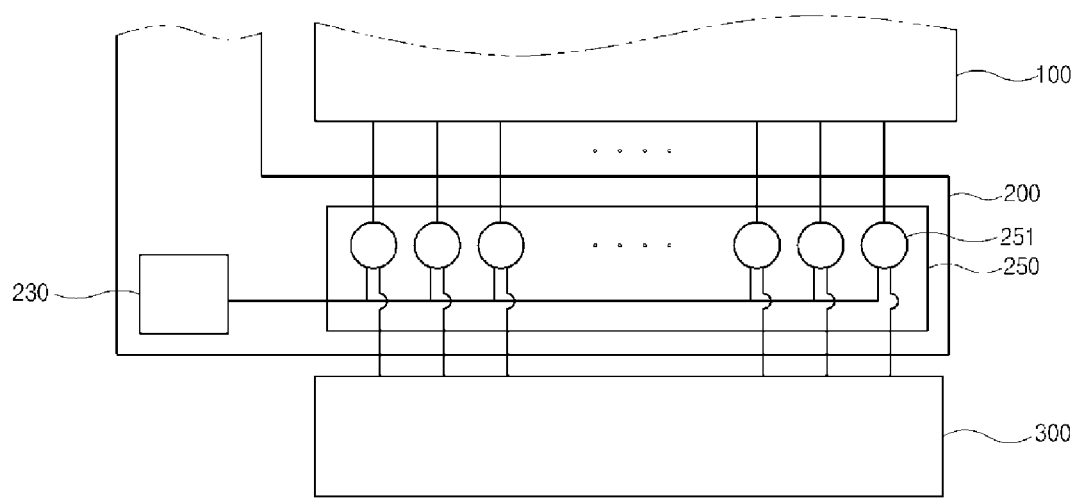
FIG. 4 illustrates a schematic view of a switching unit and a touch sensing unit of the display device having a touch screen according to an embodiment.

FIG. 2 is a view illustrating a structure of a display device having a touch screen, according to an embodiment. FIG. 3 illustrates a panel 100 of the display device having the touch screen illustrated in FIG. 2. FIG. 4 illustrates a switching unit 250 and a touch sensing unit 300 of the display device having the touch screen illustrated in FIG. 2.

As shown in FIG. 2, the display device having the touch screen may include the panel 100, a display driving unit 200, and the touch sensing unit 300.

The panel 100 may have a touch screen (not shown) installed therein, and the touch screen may function to detect a location at which a user's touch occurs. As an example, the touch screen may be an in-cell type touch screen to which a self-capacitive scheme is applied.

The panel 100 may have a structure in which a liquid crystal layer is formed between two substrates. In one example, on the lower substrate of the panel 100, a plurality of gate lines GL1 through GLn, a plurality of data lines DL1 through DLn intersecting the gate lines GL1 through GLn, and a plurality of thin film transistors (TFTs) formed at intersections of the data lines DL1 through DLn and the gate lines GL1 through GLn may be formed, such that a plurality of pixels may be arranged in a matrix form due to the intersection structure of the data lines DL1 through DLn and the gate lines GL1 through GLn.

Also, the panel 100 may include, as shown in FIG. 3, a plurality of electrodes 120 and a plurality of wires 130.

In response to a common voltage being applied for display driving of the panel 100, the electrodes 120 may act as common electrodes for driving liquid crystal together with pixel electrodes formed at the individual pixels. Also, in response to a touch scan signal for touch sensing being applied thereto, the electrodes 120 may act as touch electrodes for detecting a location at which a touch has occurred.

Also, the electrodes 120 may be grouped into three groups 110 of a first group 111, a second group 112, and a third group 113, in the panel 100, the groups 110 each having, for example, a block shape.

The groups 110 of the panel 100 may be arranged in the direction in which the gate lines GL1 through GLn extend in order to receive the common voltage for display driving and the touch scan signal for touch sensing in synchronization of a gate signal input to the gate lines GL1 through GLn.

The wires 130 may connect the electrodes 120 to the display driving unit 200. For example, the wires 130 may function to transfer a common voltage or a touch scan signal applied from the display driving unit 200 to the electrodes 120 of the panel 100, and may transfer changes in capacitance received from the electrodes 120 to the display driving unit 200. In one example, the changes in capacitance may be transferred to the touch sensing unit 300 through the display driving unit 200.

With reference again to FIG. 2, the display driving unit 200 may include a gate driver 210 for applying a scan signal to the gate lines GL1 through GLn formed on the lower substrate of the panel 100, a data driver 220 for applying a data signal RGB to the data lines DL1 through DLn formed on the lower substrate of the panel 100, a common voltage generator 230 for applying a common voltage to the electrodes 120, a timing controller 240 for controlling the gate driver 210 and the data driver 220, and the switching unit 250.

First, the gate driver 210 may shift a gate start pulse GSP received from the timing controller 240 according to a gate shift clock GSC, and may supply a gate signal having a gate on voltage Von to the gate lines GL1 through GLn, sequentially, and the gate signal may include a gate scan signal. Also, while no gate signal having the gate on voltage Von may be supplied, the gate driver 210 may supply a gate off voltage Voff to the gate lines GL1 through GLn.

Meanwhile, the gate driver 210 may be provided independently from the panel 100 and may be electrically connected to the panel 100 by various methods. However, it may also be possible for the gate driver 210 to be packaged with the panel 100, that is, the panel 100 may be a gate in panel (GIP) type. In one example, gate control signals for controlling the gate driver 210 may include a start signal VST and a gate clock GCLK.

The data driver 220 may shift a source start pulse SSP received from the timing controller 240 according to a source shift clock SSC to generate a sampling signal. Also, the data driver 220 may receive pixel data (RGB image data) according to the source shift clock SSC, may latch the pixel data according to the sampling signal, may convert the pixel data into a data signal, and then may supply the data signal to the data lines DL1 through DLn in units of horizontal lines, in response to a source output enable (SOE) signal. The data signal may include a data voltage.

For this operation, the data driver 220 may be configured to include a data sampling unit, a latch unit, a digital-to-analog converter, an output buffer, etc.

The common voltage generator 230 may generate a common voltage that is to be supplied to the electrodes 120 for outputting images. The common voltage generated by the common voltage generator 230 may be supplied to the electrodes 120 through the touch sensing unit 300.

Then, the timing controller 240 may receive a timing signal, such as data enable (DE), dot clock (CLK), etc., from an external system, and may generate control signals GCS and DCS for controlling the operation timings of the gate driver 210 and the data driver 220. Also, the timing controller 400 may rearrange image data received from the external system, and may output the rearranged image data to the data driver 220.

The switching unit 250 may include, as shown in FIG. 4, a plurality of switches 251, and may perform switching such that the common voltage generated by the common voltage generator 230 may be applied to the electrodes of the panel 100 or such that the touch scan signal generated by the touch sensing unit 300 may be applied to the electrodes of the panel 100.

In other words, the switches 251 of the switching unit 250 may perform switching such that the touch scan signal generated by the touch sensing unit 300 may be sequentially applied to one or more groups of the three groups 111, 112, and 113, except for a group corresponding to gate lines to which a gate signal is applied, in units of groups, and the common voltage generated by the common voltage generator 230 may be applied to the groups to which no touch scan signal is applied.

For example, if the group corresponding to the gate lines to which the gate signal is applied is the first group 111, the switches 251 may perform switching such that the touch scan signal may be applied to the second group 112 or the third group 113.

At this time, the switches 251 may perform switching such that the common voltage may be applied to the groups to which no touch scan signal is applied. As an example, the electrodes belonging to the first group 111 may act as electrodes for display driving due to the gate signal applied from the gate lines, and the electrodes belonging to the second group 112 or the third group 113 to which the touch scan signal is applied may act as electrodes for touch sensing.

If the group corresponding to the gate lines to which the gate signal is applied is the second group 112, the switches 251 may perform switching such that the touch scan signal may be applied to the first group 111 or the third group 113.

At this time, the switches 251 may perform switching such that the common voltage may be applied to the groups to which no touch scan signal is applied. As an example, the electrodes belonging to the second group 112 may act as electrodes for display driving due to the gate signal applied from the gate lines, and the electrodes belonging to the group to which the touch scan signal is applied may act as electrodes for touch sensing.

Likewise, if the group corresponding to the gate lines to which the gate signal is applied is the third group 113, the switches 251 may perform switching such that the touch scan signal generated by the touch sensing unit 300 may be sequentially applied to one or more groups other than the group corresponding to the gate lines to which the gate signal is applied, in units of groups, and the common voltage may be applied to the groups to which no touch scan signal is applied. At this time, the electrodes belonging to the third group 113 may act as electrodes for display driving, and the electrodes belonging to the group to which the touch scan signal is applied may act as electrodes for touch sensing.

However, in some cases, it may also be possible for the switches 251 to perform switching such that the touch scan signal may be applied to all the remaining groups other than the group corresponding to the gate lines to which the gate signal is applied. For example, if the group corresponding to the gate lines to which the gate signal is applied is the first group 111, the switches 251 may perform switching such that the touch scan signal may be applied to the second and third groups 112 and 113 simultaneously.

As described above, as the display device having the touch screen may spatially separates display periods from touch periods, instead of temporally separating display periods from touch periods, such that display driving may be performed simultaneously with touch driving, it may be possible to ensure a long touch sensing time upon touch driving, resulting in improvement of touch detection performance and accuracy in touch detection, while ensuring a long charging time upon display driving, preventing deterioration in display quality.

The touch sensing unit 300 may apply the touch scan signal to the display driving unit 200, and may detect a user's touch based on changes in capacitance received from the plurality of electrodes of the panel through the display driving unit 200.

The touch scan signal generated by the touch sensing unit 300 may be a touch driving voltage, and the minimum value of the touch driving voltage may be greater than the value of the common voltage applied to the electrodes of the panel 100 for display driving.

Also, the touch sensing unit 300 may include a component (not shown) for touch sensing. For example, the touch sensing unit 300 may include a component that detects a user's touch location using changes in capacitance at the user's touch location if the user touches a specific area of the panel 100 with his or her finger or a pen/stylus in response to a touch scan signal for touch sensing being applied to the electrodes of the panel 100.

The component for touch sensing may be included, for example, in the touch sensing unit 300 or the timing controller 240, or may be provided outside the touch sensing unit 300.

Meanwhile, the display device having the touch screen may drive electrodes for sensing a touch, in units of groups, sequentially, and may supply a common voltage for display driving and a touch scan signal for touch sensing, respectively, in units of groups, according to a gate signal applied to the gate lines.

Hereinafter, a method of driving the display device having the touch screen described above will be described with reference to FIGS. 5, 6, and 7.

Figure 5:
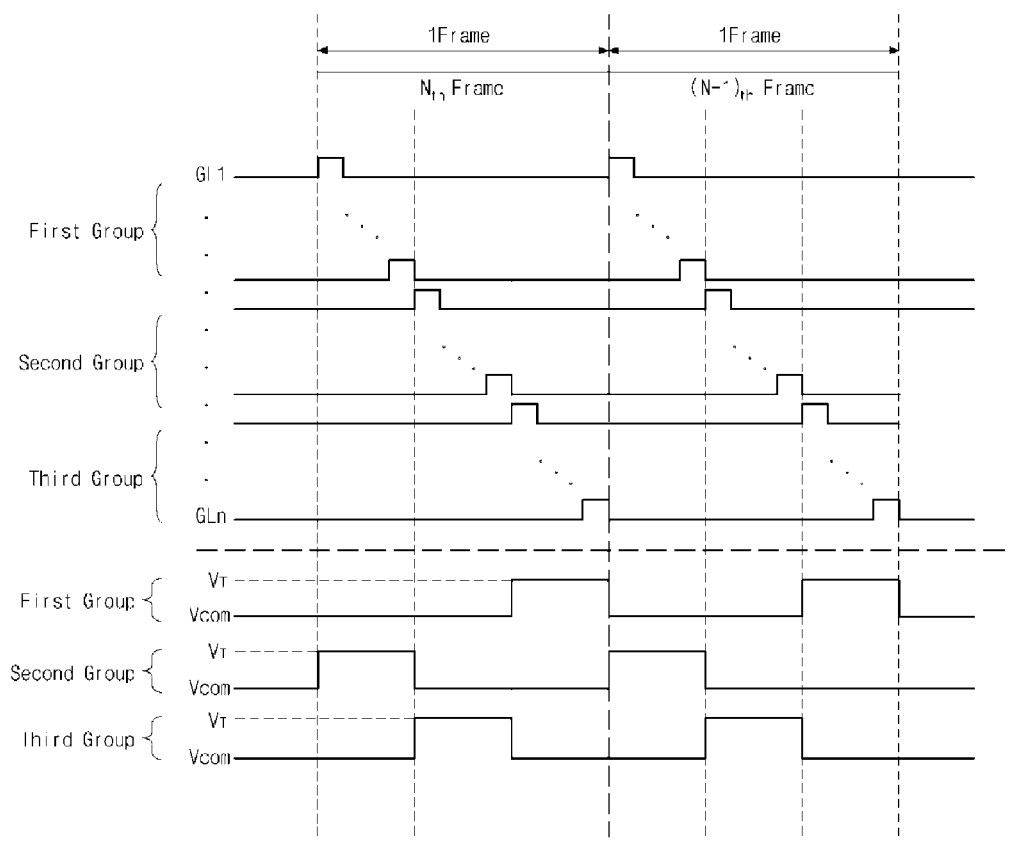
FIGS. 5 to 7 are timing diagrams of signals for driving the display device having a touch screen according to an embodiment.
Figure 6:
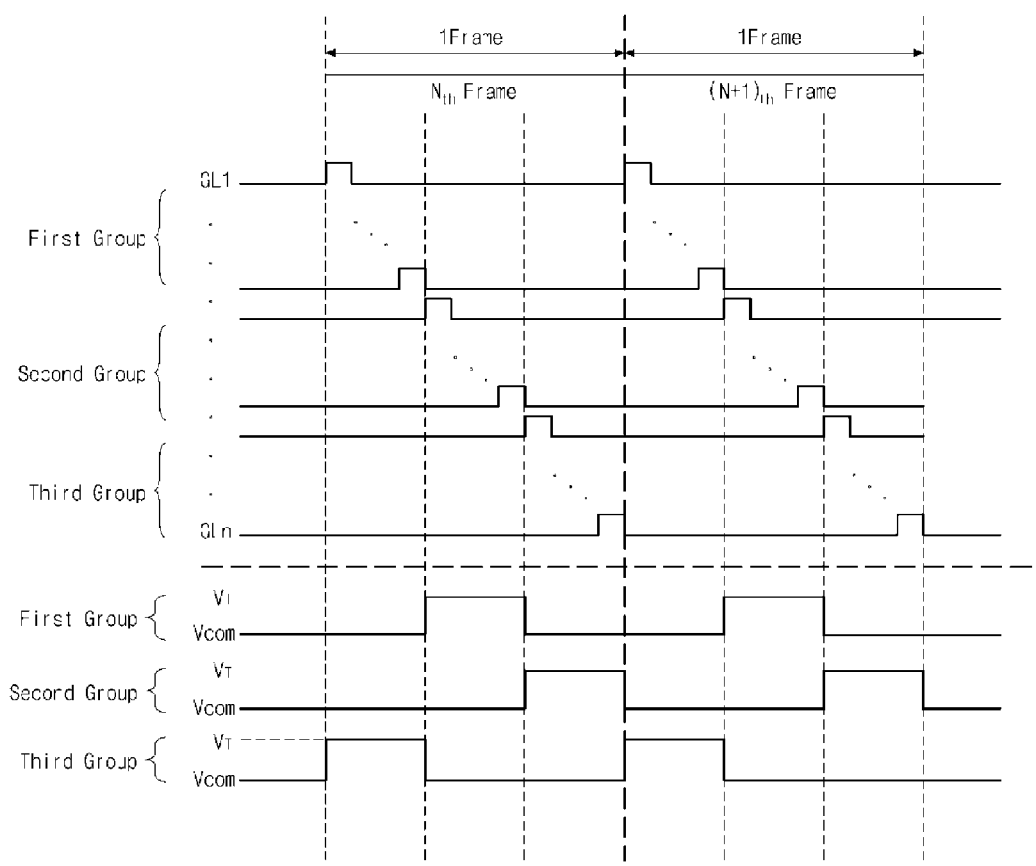
Figure 7:
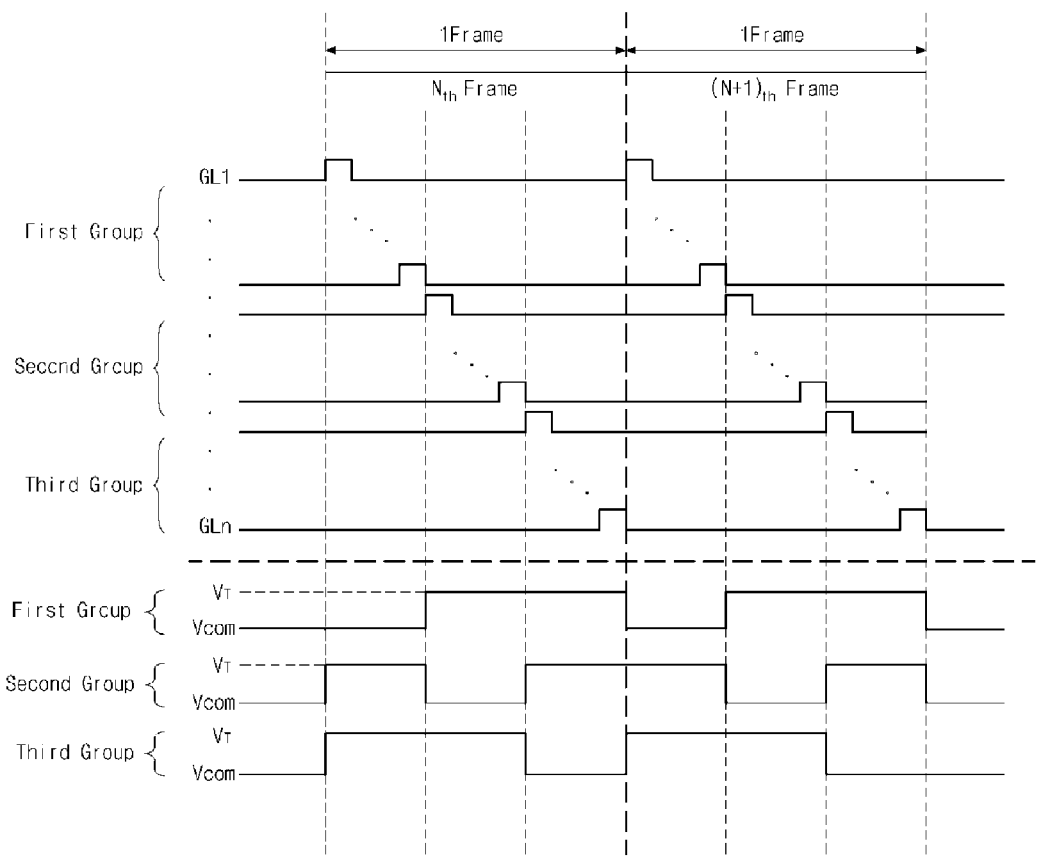

FIGS. 5 to 7 are timing diagrams of signals for driving the display device having the touch screen illustrated in FIG. 2.

The display device having the touch screen may include a panel, a display driving unit, and a touch sensing unit. The panel may include a plurality of electrodes grouped into three groups arranged in the direction in which gate lines GL1 through GLn extend, and each group may correspond to a plurality of gate lines.

According to the method of driving the display device having the touch screen, first, as shown in FIG. 5, a gate signal may be applied to a plurality of gate lines corresponding to each group.

For example, a gate driver in the display driving unit may shift a gate start pulse received from a timing controller according to a gate shift clock, and may apply a gate signal having a gate on voltage to the gate lines GL1 through GLn, sequentially.

Then, during one frame, a touch scan signal $V_T$ for touch sensing may be applied to electrodes belonging to at least one group other than a group corresponding to gate lines to which the gate signal is applied, and a common voltage $V_{com}$ may be applied to electrodes belonging to the remaining groups to which no touch scan signal $V_T$ is applied.

In response to the common voltage $V_{com}$ being applied to the electrodes belonging to the group corresponding to the gate lines to which the gate signal is applied, the electrodes may act as electrodes for display driving due to the gate signal having the gate on voltage, and electrodes belonging to the group to which the touch scan signal is applied may act as electrodes for touch sensing due to the touch scan signal.

For example, if a gate signal is applied to gate lines corresponding to a first group, the display driving unit 200 may apply a touch scan signal $V_T$ to electrodes belonging to a second group, and may apply a common voltage $V_{com}$ to the first group and a third group to which no touch scan signal $V_T$ is applied.

The electrodes belonging to the second group to which the touch scan signal $V_T$ is applied may act as electrodes for touch sensing, and the electrodes belonging to the first group corresponding to the gate lines to which the gate signal is applied may act as electrodes for display driving if the common voltage $V_{com}$ is applied.

If the gate signal is applied to the gate lines corresponding to the second group after the gate signal is applied to the gate lines corresponding to the first group, the display driving unit 200 may apply the touch scan signal $V_T$ to the electrodes belonging to the third group, and may apply the common voltage $V_{com}$ to the electrodes belonging to the first and second groups to which no touch scan signal $V_T$ is applied.

The electrodes belonging to the third group to which the touch scan signal $V_T$ is applied may act as electrodes for touch sensing, and the electrodes belonging to the second group corresponding to the gate lines to which the gate signal is applied may act as electrodes for display driving if the common voltage $V_{com}$ is applied.

If the gate signal is applied to the gate lines corresponding to the third group after the gate signal is applied to the gate lines corresponding to the second group, the display driving unit 200 may apply the touch scan signal $V_T$ to the electrodes belonging to the first group, and may apply the common voltage $V_{com}$ to the second and third groups to which no touch scan signal $V_T$ is applied.

The electrodes belonging to the first group to which the touch scan signal $V_T$ is applied may act as electrodes for touch sensing, and the electrodes belonging to the third group corresponding to the gate lines to which the gate signal is applied may act as electrodes for display driving if the common voltage $V_{com}$ is applied.

In one example, the touch scan signal may be a touch driving voltage, and the minimum value of the touch driving voltage may be greater than the value of the common voltage $V_{com}$ that is applied to a plurality of electrodes of the panel for display driving.

The method of driving the display device having the touch screen, as shown in FIG. 5, may include performing the above-described process repeatedly in units of frames.

Hereinafter, another method of driving the display device having the touch screen will be described with reference to FIG. 6, and the same operations as described above with reference to FIG. 5 will not be described again.

As shown in FIG. 6, if a gate signal is applied to gate lines corresponding to the first group, the display driving unit 200 may apply a touch scan signal $V_T$ to electrodes belonging to the third group, and may apply a common voltage $V_{com}$ to electrodes belonging to the remaining groups to which no touch scan signal is applied.

Further, if the gate signal is applied to gate lines corresponding to the second group, the display driving unit 200 may apply the touch scan signal $V_T$ to electrodes belonging to the first group, and may apply the common voltage $V_{com}$ to electrodes belonging to the remaining groups to which no touch scan signal $V_T$ is applied.

In addition, if the gate signal is applied to gate lines corresponding to the third group, the display driving unit 200 may apply the touch scan signal $V_T$ to electrodes belonging to the second group, and may apply the common voltage $V_{com}$ to electrodes belonging to the remaining groups to which no touch scan signal $V_T$ is applied.

The method of driving the display device having the touch screen, as shown in FIG. 6, may include performing the above-described process repeatedly in units of frames.

Hereinafter, another method of driving the display device having the touch screen will be described with reference to FIG. 7.

As shown in FIG. 7, if a gate signal is applied to gate lines corresponding to the first group, the display driving unit 200 may apply a touch scan signal $V_T$ to electrodes belonging to the second and third groups, and may apply a common voltage $V_{com}$ to electrodes belonging to the first group to which no touch scan signal is applied.

Further, if the gate signal is applied to gate lines corresponding to the second group, the display driving unit 200 may apply the touch scan signal $V_T$ to electrodes belonging to the first and third groups, and may apply the common voltage $V_{com}$ to electrodes belonging to the second group to which no touch scan signal $V_T$ is applied.

In addition, if the gate signal is applied to gate lines corresponding to the third group, the display driving unit 200 may apply the touch scan signal $V_T$ to the electrodes belonging to the first and second groups, and may apply the common voltage $V_{com}$ to the electrodes belonging to the third group to which no touch scan signal $V_T$ is applied.

As such, as shown in FIG. 7, the method of driving the display device having the touch screen may include applying a touch scan signal to all the remaining groups other than a group corresponding to gate lines to which a gate signal is applied.

The method of driving the display device having the touch screen, as shown in FIG. 7, may include performing the above-described process repeatedly in units of frames.

Therefore, according to the methods of driving the display device having the touch screen, as described above, by spatially separating display periods from touch periods, instead of temporally separating display periods from touch periods, it may be possible to simultaneously perform display driving and touch driving. Accordingly, it may be possible to ensure a long touch sensing time upon touch driving, resulting in improvement of touch detection performance and accuracy in touch detection, while ensuring a long charging time upon display driving, thereby preventing deterioration in display quality.

Figure 8:
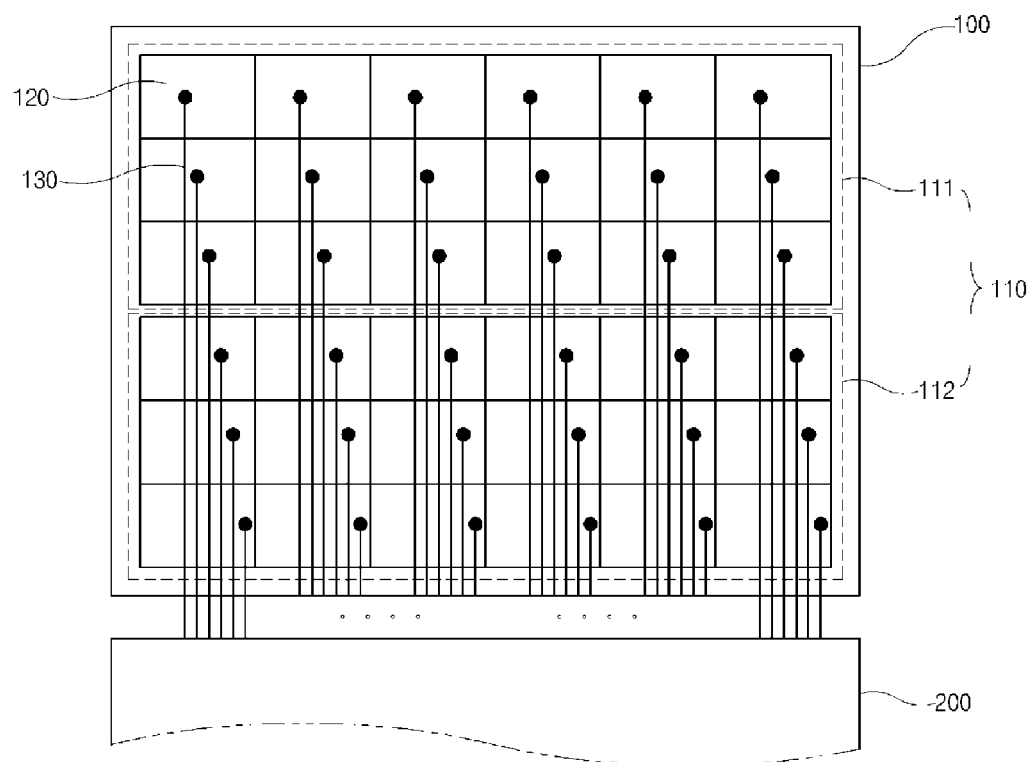
FIG. 8 illustrates a panel of a display device having a touch screen according to an embodiment.

FIG. 8 illustrates a panel 100 of a display device having a touch screen according to an embodiment.

Referring to FIG. 8, the panel 100 may include a plurality of electrodes 120 and a plurality of wires 130.

If a common voltage for display driving of the panel 100 is applied to the electrodes 120, the electrodes 120 may act as common electrodes for driving liquid crystal together with pixel electrodes formed at pixels, and if a touch scan signal for touch sensing is applied to the electrodes 120, the electrodes 120 may act as touch electrodes for detecting a touch location.

The electrodes 120 may be grouped into two groups 110 of a first group 111 and a second group in the panel 100, the groups 100 each having, for example, a block shape.

The groups of the panel 100 may be, as shown in FIG. 8, arranged in the direction in which gate lines extend in order to supply a common voltage for display driving and a touch scan signal for touch sensing to the electrodes 120 in association with a gate signal input to the gate lines.

The wires 130 may connect the electrodes 120 to a display driving unit 200. For example, the wires 130 may transfer a common voltage or a touch scan signal supplied from the display driving unit 200 to the electrodes 120 of the panel 100, and may detect changes in capacitance received from the electrodes 120 and may transfer the results of the detection to the display driving unit 200. In one example, the changes in capacitance may be transferred to the touch sensing unit 300 through the display driving unit 200

Figure 9:
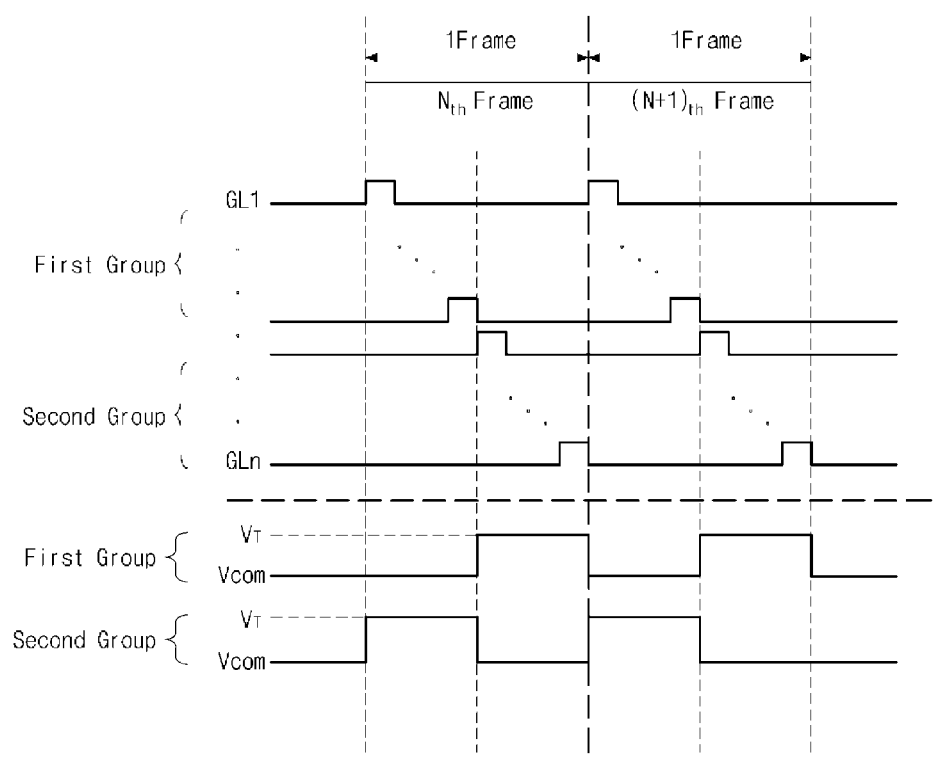
FIG. 9 is a timing diagram of signals for driving the display device having a touch screen according to an embodiment.

FIG. 9 is a timing diagram of signals for driving the display device having the touch screen of an embodiment.

As shown in FIG. 9, a touch scan signal $V_T$ may be applied to electrodes belonging to a group other than a group to which a gate signal is applied, and a common voltage $V_{com}$ may be applied to electrodes belonging to the remaining group to which no touch scan signal $V_T$ is applied.

For example, if a gate signal is applied to gate lines corresponding to a first group, the display driving unit 200 may apply a touch scan signal $V_T$ to electrodes belonging to the second group, and may apply a common voltage to electrodes belonging to the first group to which no touch scan signal is applied.

Further, if a gate signal is applied to gate lines corresponding to the second group, the display driving unit 200 may apply the touch scan signal $V_T$ to electrodes belonging to the first group, and may apply the common voltage $V_{com}$ to electrodes belonging to the second group to which no touch scan signal $V_T$ is applied.

In one example, the touch scan signal $V_T$ may be a touch driving voltage, and the minimum value of the touch driving voltage may be greater than the value of the common voltage $V_{com}$ that is applied to the electrodes of the panel 100 for display driving.

The method of driving the display device having a touch screen, as shown in FIG. 9, may include performing the above-described process repeatedly in units of frames.

By spatially separating display periods from touch periods, instead of temporally separating display periods from touch periods, it may be possible to simultaneously perform display driving and touch driving.

Accordingly, it may be possible to ensure a long touch sensing time upon touch driving, resulting in improvement of touch detection performance and accuracy in touch detection.

Also, it may be possible to ensure a long charging time upon display driving, resulting in prevention of deterioration in display quality.

It will be apparent to those skilled in the art that various modifications and variations can be made in embodiments of the present invention without departing from the spirit or scope of the invention. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device comprising a touch screen, comprising:
a panel, comprising:
a plurality of gate lines;
a plurality of data lines; and
a plurality of electrodes grouped into n groups in a direction in which the plurality of gate lines extend, where n is an integer equal to or greater than 2;
a display driving unit configured to:
apply a gate signal to each of the plurality of gate lines;
apply a data signal to each of the plurality of data lines; and
apply a common voltage or a touch scan signal to each of the plurality of electrodes; and
a touch sensing unit configured to:
generate the touch scan signal; and
apply the touch scan signal to the display driving unit,
wherein the display driving unit is further configured to apply the touch scan signal to at least one group of the electrodes, other than a group of the electrodes corresponding to gate lines to which the gate signal is applied,
wherein the display driving unit is further configured to respectively apply the common voltage and the touch scan signal via a plurality of wires, the plurality of wires being respectively directly connected to the plurality of electrodes with a one-to-one correspondence,
wherein the plurality of electrodes in each of the n groups are electrically insulated from each other, and
wherein the common voltage or the touch scan signal is individually applied to the plurality of electrodes in each of the n groups.

2. The display device of claim 1, wherein the display driving unit is further configured to apply the touch scan signal to a plurality of groups other than the group corresponding to the gate lines to which the gate signal is applied, among the n groups.

3. The display device of claim 1, wherein the display driving unit is further configured to apply the touch scan signal to the remaining groups other than the group corresponding to the gate lines to which the gate signal is applied, among the n groups.

4. The display device of claim 1, wherein the display driving unit is further configured to apply the common voltage to the remaining groups other than the group to which the touch scan signal is applied, among the n groups.

5. The display device of claim 4, wherein the display driving unit comprises a switching unit configured to perform switching such that the touch scan signal is applied to a plurality of electrodes belonging to the at least one group, or such that the common voltage is applied to a plurality of electrodes belonging to the remaining groups other than the group to which the touch scan signal is applied.

6. The display device of claim 1, wherein the display driving unit comprises a common voltage generator configured to generate the common voltage.

7. The display device of claim 1, wherein a minimum value of the touch scan signal is a voltage value greater than a value of the common voltage.

8. A method of driving a display device having a touch screen, the display device comprising a panel comprising a plurality of electrodes grouped into n groups, where n is an integer greater than 2, a display driving unit, and a touch sensing unit, the method comprising:
at the touch sensing unit, applying a touch scan signal to the display driving unit; and
at the display driving unit:
applying a gate signal to each of a plurality of gate lines corresponding to a first group among the n groups;
applying a common voltage to each of a plurality of electrodes belonging to the first group; and
applying a touch scan signal to each of a plurality of electrodes belonging to a second group of the n groups,
wherein the display driving unit is further configured to respectively apply the common voltage and the touch scan signal via a plurality of wires, the plurality of wires being respectively directly connected to the plurality of electrodes with a one-to-one correspondence,
wherein the plurality of electrodes in each of the n groups are electrically insulated from each other, and
wherein the common voltage or the touch scan signal is individually applied to the plurality of electrodes in each of the n groups.

9. The method of claim 8, further comprising:
at the display driving unit, applying the gate signal to a plurality of gate lines belonging to a second group, among the n groups; and
at the display driving unit, applying the touch scan signal to a plurality of electrodes belonging to at least one group, among the n groups, other than the second group.

10. The method of claim 9, wherein the applying of the touch scan signal to the plurality of electrodes belonging to the at least one group other than the second group comprises applying the touch scan signal to a plurality of electrodes belonging to a plurality of groups other than the second group among the n groups.

11. The method of claim 9, wherein the applying of the touch scan signal to the plurality of electrodes belonging to the at least one group other than the second group comprises applying the touch scan signal to a plurality of electrodes belonging to the remaining groups other than the second group among the n groups.

12. The method of claim 9, further comprising, at the display driving unit, applying the common voltage to a plurality of electrodes belonging to the remaining groups other than the at least one group to which the touch scan signal is applied.

13. The method of claim 8, wherein a minimum value of the touch scan signal is a voltage value greater than a value of the common voltage.

14. A method of driving display device comprising a touch screen, the display device comprising a panel comprising a plurality of gate lines, and a plurality of electrodes respectively corresponding to the plurality of gate lines, the method comprising:

applying, by a touch sensing unit, a touch scan signal to a display driving unit;
applying, by the display driving unit:
a gate signal to a subset of each of the plurality of gate lines;
a common voltage to a first subset of each of the plurality of electrodes, corresponding to the subset of each of the plurality of gate lines; and
a touch scan signal to a second subset of each of the plurality of electrodes, other than the first subset of each of the plurality of electrodes,
wherein the display driving unit is further configured to respectively apply the common voltage and the touch scan signal via a plurality of wires, the plurality of wires being respectively directly connected to the plurality of electrodes with a one-to-one correspondence,
wherein the plurality of electrodes in each of the n groups are electrically insulated from each other, and
wherein the common voltage or the touch scan signal is individually applied to the plurality of electrodes in each of the n groups.

15. The method of claim 14, wherein the applying of the touch scan signal to the second subset of the plurality of electrodes comprises applying the touch scan signal to at least one third subset of the plurality of electrodes, within the second subset of the plurality of electrodes, the at least one third subset of the plurality of electrodes being fewer than all of the second subset of the plurality of electrodes.

16. The method of claim 14, wherein the applying of the touch scan signal to the second subset of the plurality of electrodes comprises applying the touch scan signal to the entire second subset of the plurality of electrodes.

17. The method of claim 14, further comprising, at the display driving unit, applying the common voltage to the second subset of the plurality of electrodes.

18. The method of claim 14, wherein a minimum value of the touch scan signal is a voltage value greater than a value of the common voltage.

* * * * *